Figure 1:
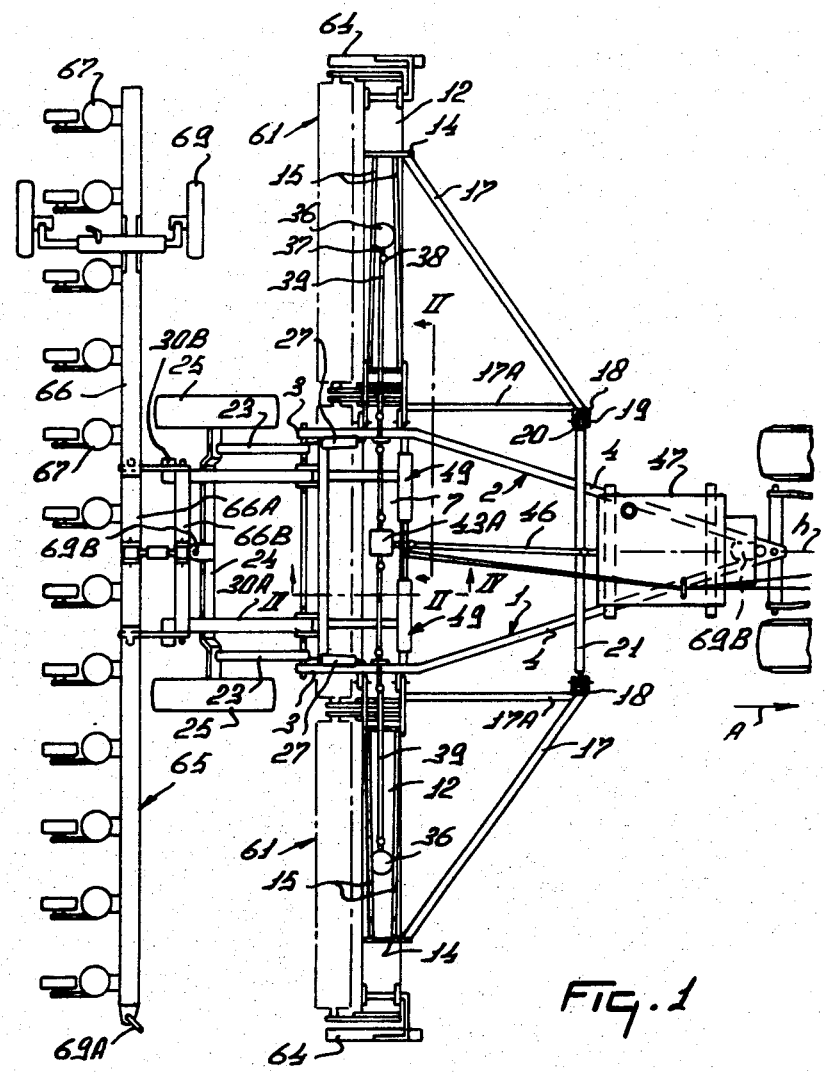

United States Patent [19]

van der Lely

[11] 4,136,743

[45] Jan. 30, 1979

[54] SOIL CULTIVATING IMPLEMENT

[76] Inventor: Ary van der Lely, Weverskade 10, Maasland, Netherlands

[21] Appl. No.: 757,159

[22] Filed: Jan. 6, 1977

[30] Foreign Application Priority Data

Jan. 8, 1976 [NL] Netherlands .......................... 7600141

[51] Int. Cl.² .......................................... A01B 33/06
[52] U.S. Cl. .................................. 172/59; 172/311; 172/117
[58] Field of Search ............... 172/310, 311, 457, 417, 172/59, 49, 466, 452, 413

[56] References Cited

U.S. PATENT DOCUMENTS

| 638,769 | 12/1899 | Smith | 172/626 X |
|---|---|---|---|
| 2,704,021 | 3/1955 | Brundage | 172/466 |
| 3,250,333 | 5/1966 | Day | 172/126 |
| 3,633,679 | 1/1972 | Dahlberg | 172/417 |
| 3,667,551 | 6/1972 | Lely | 172/59 |
| 3,797,580 | 3/1974 | Roth | 172/311 |
| 3,885,633 | 5/1975 | Lely | 172/59 |
| 3,967,684 | 7/1976 | Haverdink | 172/311 |

FOREIGN PATENT DOCUMENTS

| 1902287 | 9/1969 | Fed. Rep. of Germany | 172/311 |
|---|---|---|---|
| 2302311 | 8/1973 | Fed. Rep. of Germany | 172/311 |

Primary Examiner—Richard J. Johnson
Attorney, Agent, or Firm—Mason, Mason and Albright

[57] ABSTRACT

A cultivating implement has a main frame comprised of beams that support an elongated central frame portion that has rotatable soil working members mounted in a transverse row. At each lateral side of the central portion, an outer elongated frame portion, with a corresponding group of further soil working members, is pivoted. In working position, the outer portions comprise extensions of the central portion so that a broad strip of ground is worked. For transport, the outer portions can be pivoted upwardly by hydraulic assemblies about pivots that interconnect same to the central portion, and the central portion can be raised out of ground contact by further hydraulic assemblies that move rear ground wheels into supporting position. Each of the hydraulic assemblies has a latch that cooperates with a pin to retain the outer portions and ground wheels in transport position. A cable or rope to the operator can pivot and release the latch so that a working position can be assumed. Each frame portion can be linked to the main frame by parallelogram linkages to match ground undulations. Driving connections via respective gear boxes engage the p.t.o. of a prime mover.

8 Claims, 8 Drawing Figures

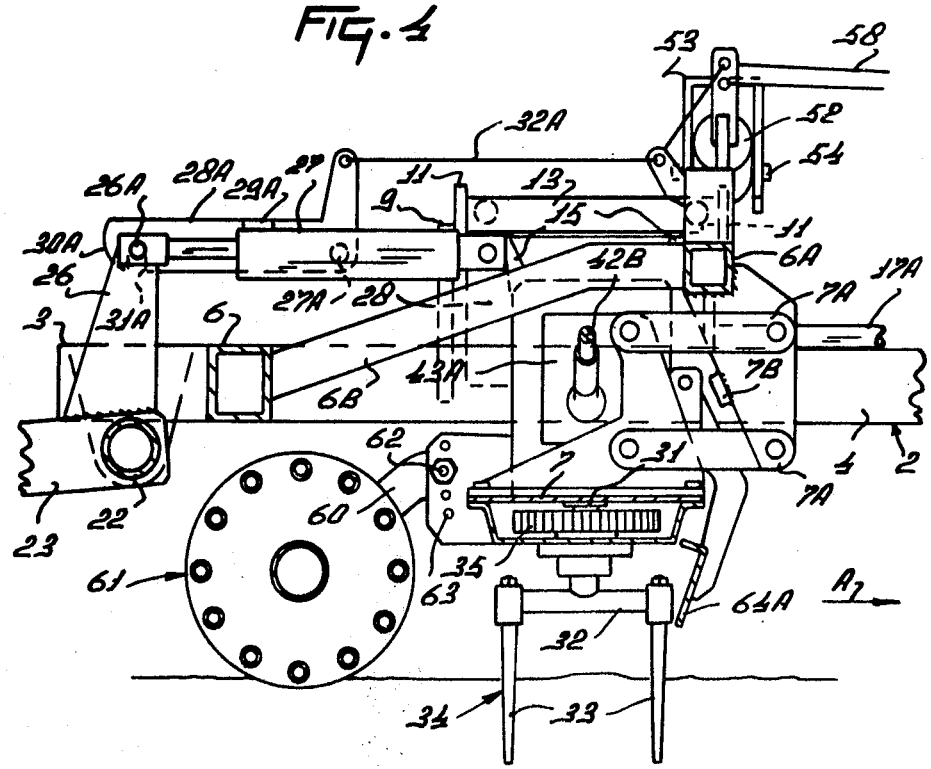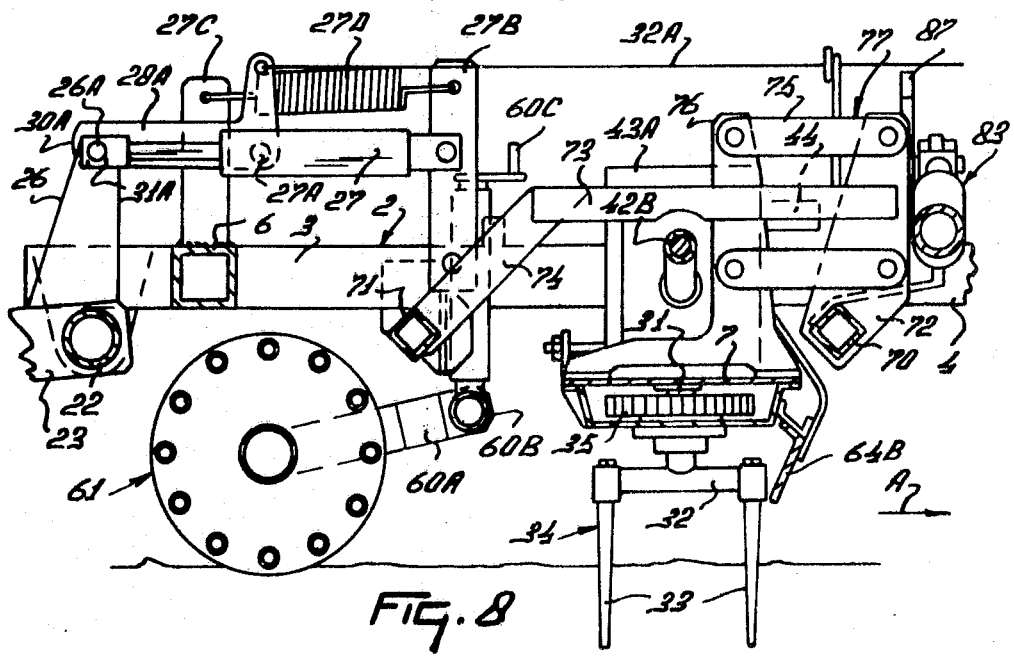

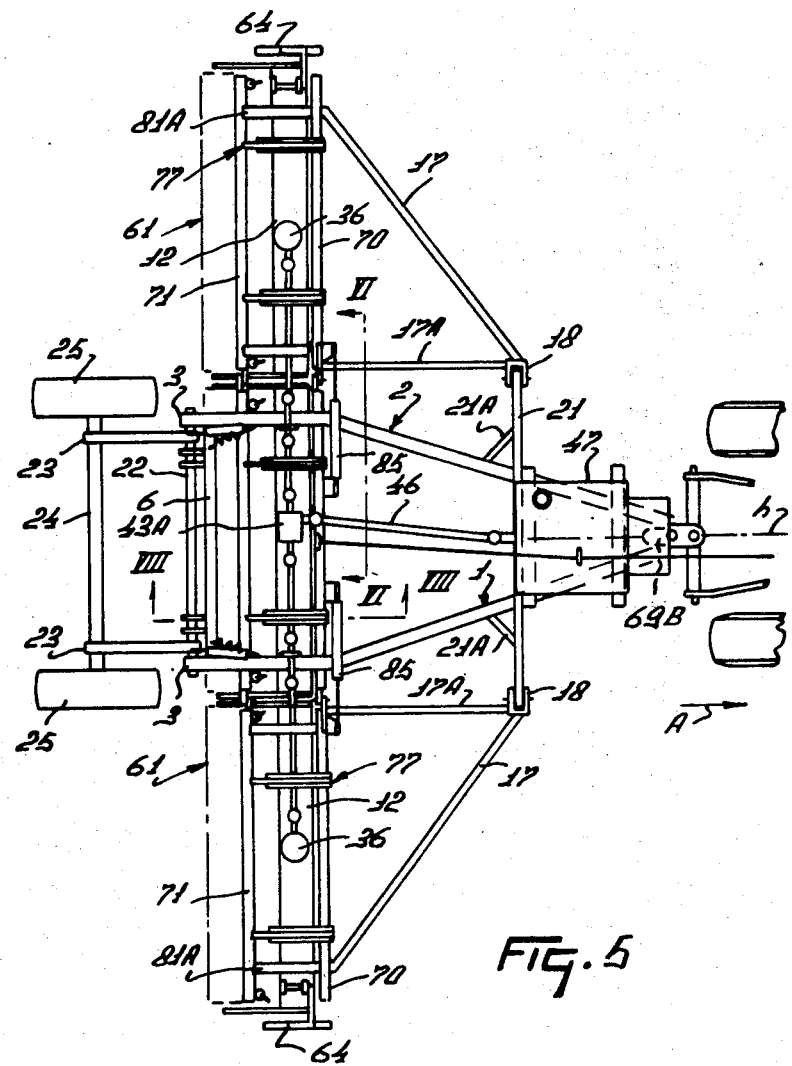

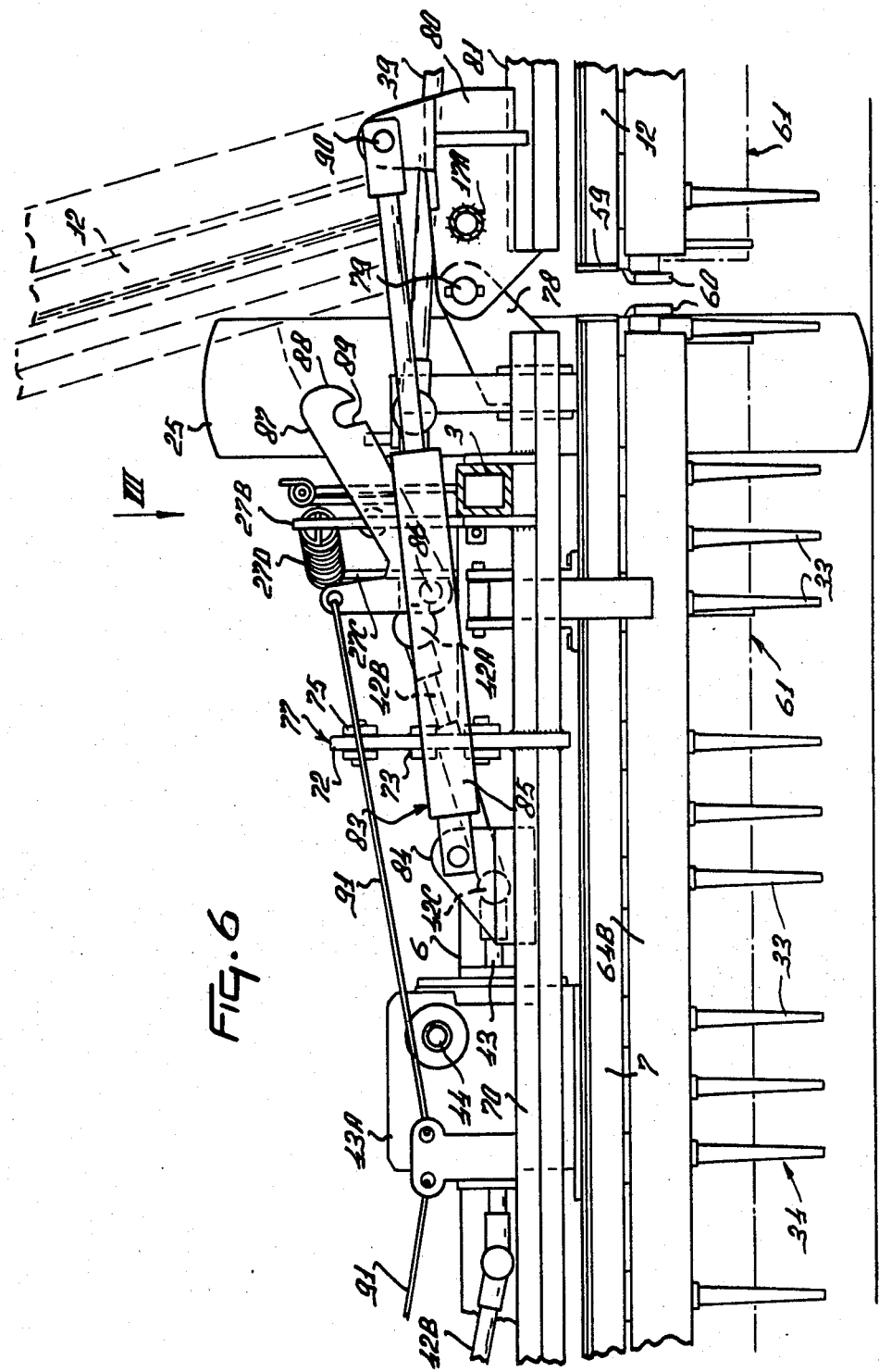

SOIL CULTIVATING IMPLEMENT

This invention relates to soil cultivating implements of the kind which comprise a frame which carries at least one group of soil working or cultivating members that are rotatable about upwardly extending axes, said group being arranged in a row that extends transverse to the intended direction of operative travel of the implement supported by ground wheels during operation of the implement and which also comprises at least one group of soil working or cultivating members that are rotatable about upwardly extending axes, said group being carried by the frame in a row that extends in a direction which is transverse to the intended direction of operative travel of the implement.

According to the invention, there is provided a soil cultivating implement of the kind set forth, wherein at least two groups of soil working or cultivating members are arranged in side-by-side relationship and at least one group is upwardly tiltable relative to at least one other group to bring the implement from a working position to a position that is suitable for the inoperative transport thereof, means being provided by which the or each upwardly tiltable group can be automatically latched in said position that is suitable for the inoperative transport of the implement.

Figure 2:
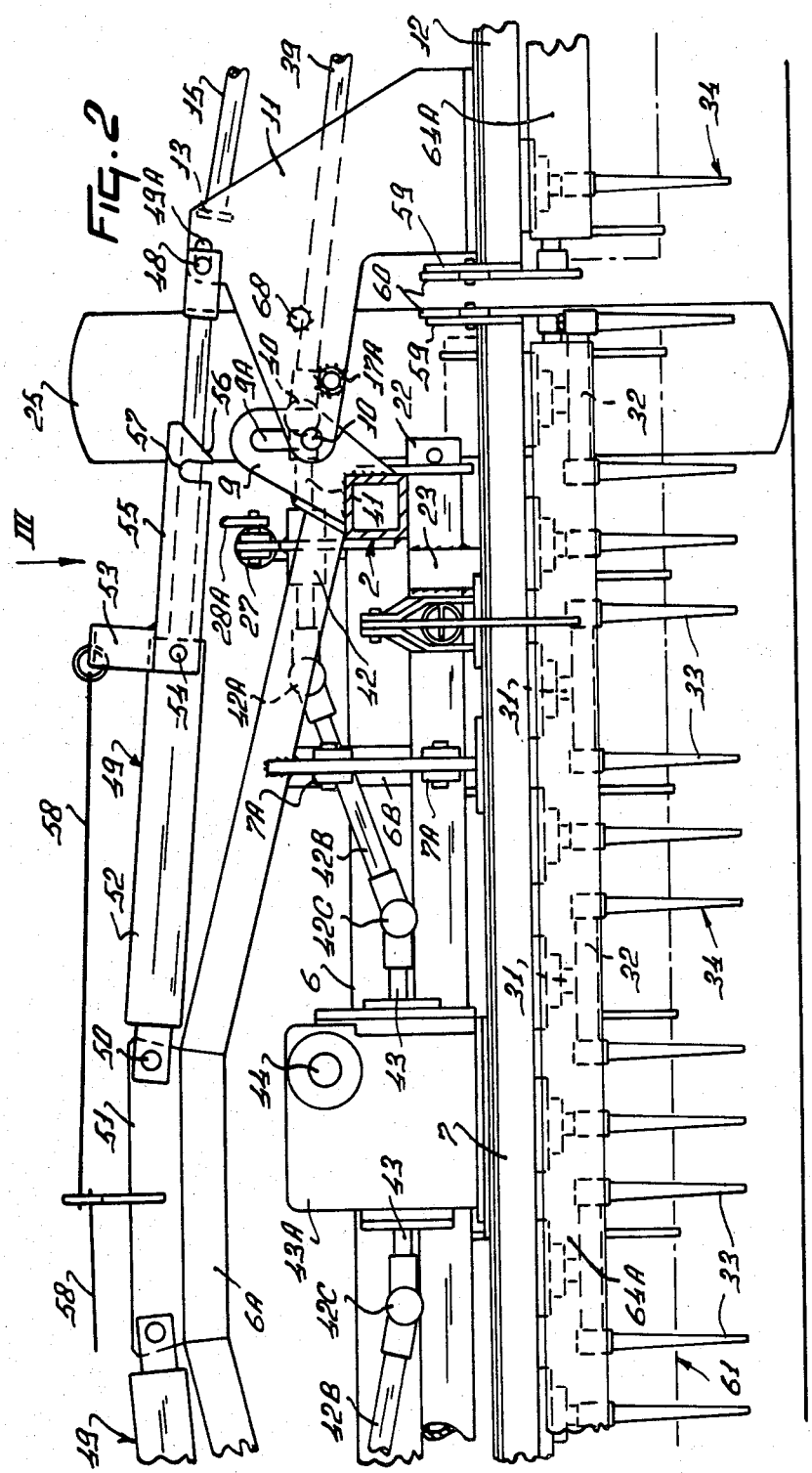
Figure 3:
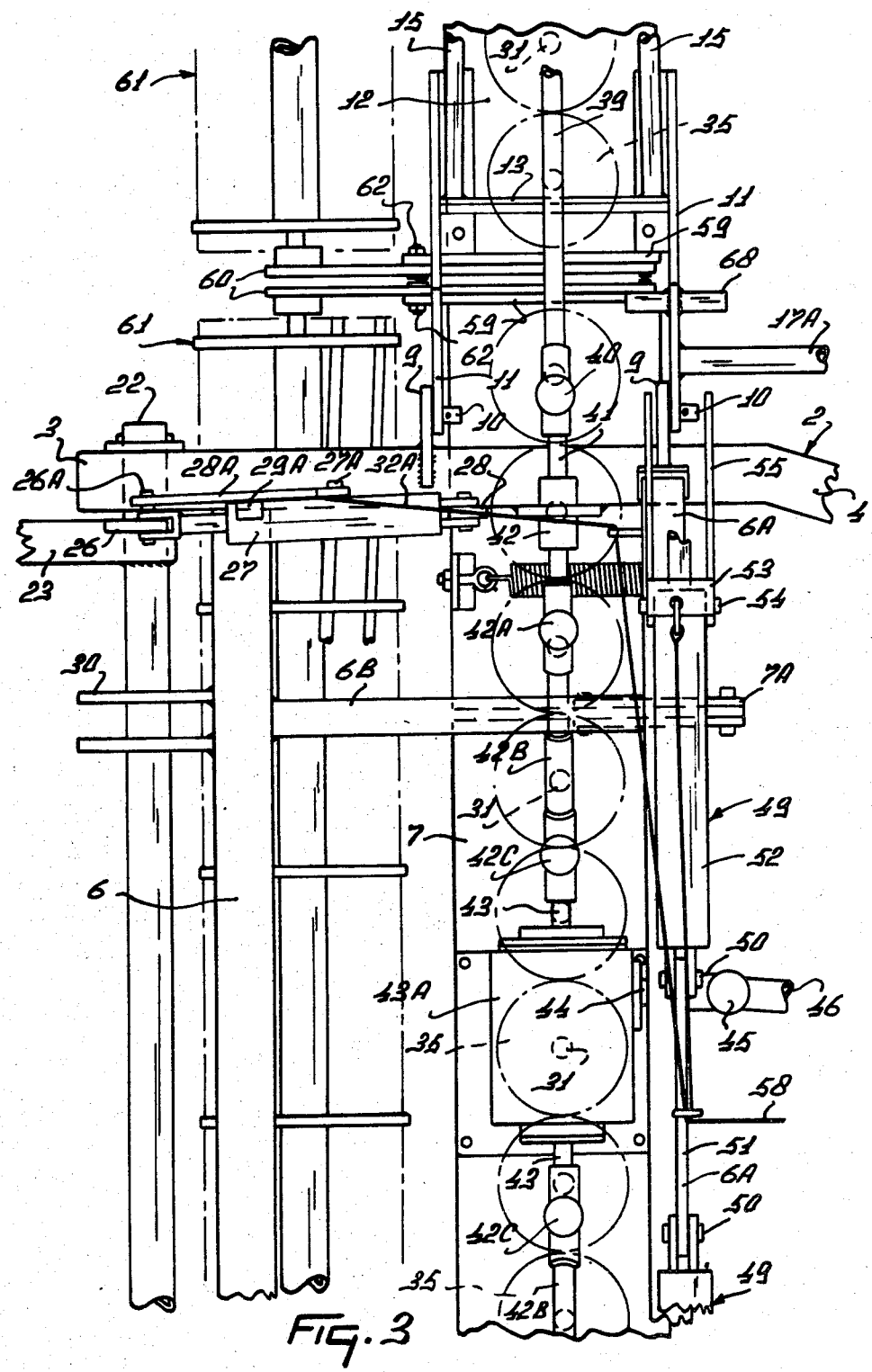
Figure 7:
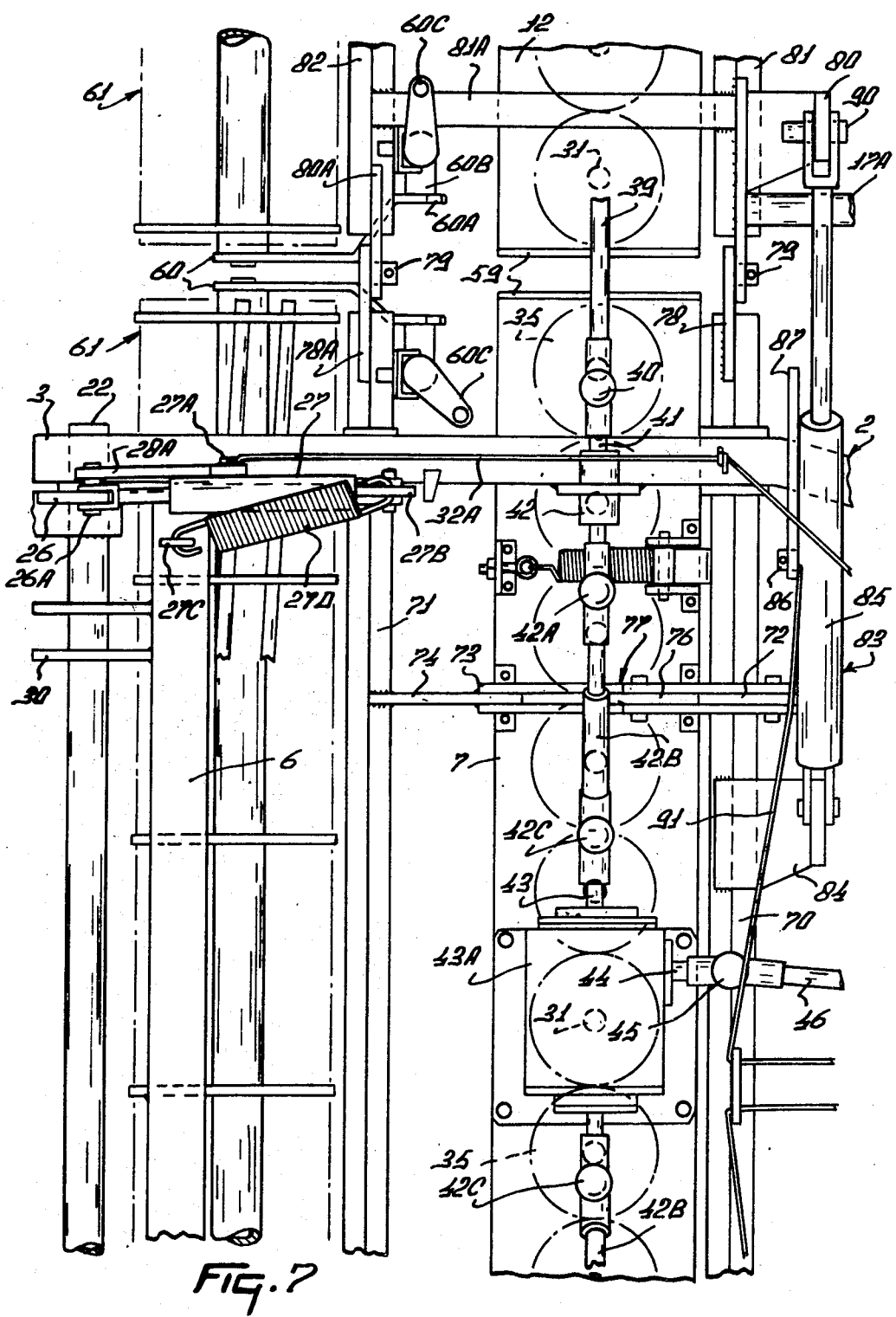

For a better understanding of the invention, and to show how the same may be carried into effect, reference will now be made, by way of example, to the accompanying drawings, in which:

FIG. 1 is a diagrammatic plan view of a form of soil cultivating implement in accordance with the invention connected to the rear of an agricultural tractor, a seed drill again provided at the rear of the implement, FIG. 2 is a section, to an enlarged scale, taken on the line II—II in FIG. 1, FIG. 3 is a plan view as seen in the direction indicated by an arrow III in FIG. 2, FIG. 4 is a section taken on the line IV—IV in FIG. 1, FIG. 5 is a diagrammatic plan view of a further embodiment of a soil cultivating implement in accordance with the invention, connected to the rear of an agricultural tractor, no seed drill being provided, FIG. 6 is a section, to an enlarged scale, taken on the line VI—VI in FIG. 5, FIG. 7 is a plan view as seen in the direction indicated by an arrow VII in FIG. 6, and FIG. 8 is a section, to an enlarged scale, taken on the line VIII—VIII in FIG. 5.

FIGS. 1 to 4 of the drawings illustrate an alternative soil cultivating implement in accordance with the invention which implement comprises a frame that includes two substantially horizontally disposed beams 1 and 2, said beams 1 and 2 comprising rear substantially parallel portions 3 and leading portions 4 that converge forwardly in substantially the direction A. All four of the portions 3 and 4 are substantially straight and the two portions 3 are both substantially parallel to the direction A. The leading ends of the convergent portions 4 of the beams 1 and 2 are provided with a coupling fork 5. The substantially parallel portions 3 of the two beams 1 and 2 are rigidly interconnected, near their rearmost ends, by a hollow beam 6 (FIG. 4) of substantially square cross-section that extends perpendicular, or at least transverse, to the direction A. A tie beam 6A of inverted shallow channel-shaped configuration rigidly interconnects the two beams 1 and 2 at points close to the integral junctions between the two portions 3 and 4 of each of the latter beams. The arrangement of the tie beam 6A is such that its substantially horizontally disposed base is located centrally uppermost with its two limbs extending downwardly, at small angles to the horizontal, from the opposite ends thereof towards the respective beams 1 and 2. Further slanting beams 6B rigidly interconnect the front of the hollow beam 6 and the rear of the tie beam 6A, the center lines of the slanting beams 6B being contained in vertical planes that are substantially parallel to the direction A. A central hollow frame portion 7 is provided that extends substantially horizontally perpendicular to the direction A, the front of said hollow frame portion 7 with respect to the direction A being substantially in vertical register with the overlying tie beam 6A. The hollow frame beam 6 and is connected to that frame beam through the intermediary of two relatively spaced parallelogram linkages 7A, the pivot pins that form parts of the linkages 7A being arranged to define axes that extend substantially horizontally perpendicular to the direction A. Each linkage 7A is provided with a corresponding stop 7B which is arranged in such a position as to prevent too great a downward displacement of the hollow frame portion 7 relative to the frame of the implement.

The rear substantially parallel portions 3 of the two frame beams 1 and 2 are each provided with two upwardly and outwardly inclined lugs 9 at locations just in front, and just behind, the central hollow frame portion 7 with respect to the direction A (see FIG. 3). Each lug 9 is formed with a vertically extending slot 9A (FIG. 2) and four pins 10 are entered through the slots 9A so as to be movable along those slots. Each pin 10 is carried by a corresponding vertically disposed plate 11 at a location on that plate which is nearest to an imaginary vertical plane of substantialy symmetry h of the implement that extends parallel to the direction A. There are, of course, four of the plates 11, that are arranged in two pairs, each pair being secured to the top of a corresponding outer hollow frame portion 12 at the end of that frame portion which is closely adjacent to one end of the central hollow frame portion 7. When the implement is operating on horizontal ground, the three frame portions 7 and 12 are in substantially strictly horizontal alignment and all three of them are of substantially identical construction. Each of the two pairs of the four pins 10 are arranged one behind the other in the direction A but with their longitudinal axes coincident, said pins affording axes about which the outer hollow frame portions 12 can pivot upwardly and downwardly relative to the central hollow frame portion 7. The two plates 11 of each pair are interconnected, near their tops, by corresponding transverse pieces 13 that both extend substantially parallel to the direction A. Each of the two outer hollow frame portions 12 is provided on its top with a corresponding substantially vertical plate 14 (FIG. 1) at a location which is towards the end of that frame portion that is remote from the central frame portion 7. Each transverse piece 13 and the corresponding plate 14 are rigidly interconnected by two supports 15 that are in gently convergent relationship from the transverse piece 13 to the plate 14, said supports 15 are also being inclined downwardly at a few degrees to the horizontal when the implement is arranged in its working position on horizontal land. Two tubular supports 17 that are forwardly convergent with respect to the direction A extend from leading regions of the two plates 14 to positions where they are provided with corresponding forks 18. Horizontal pivot pins 19 turnably connect the forks 18 to lugs 20 that are carried at the opposite ends of a horizontal beam 21 which is substantially perpendicular to the direction A and which is supported from beneath by the convergent portions 4 of the two frame beams 1 and 2. The beam 21 is connected to the beams 1 and 2 at points which are substantially the midpoints of the forwardly convergent portions 4 of those two beams. The longitudinal axis of each pivot pin 19 is coincident with those of a corresponding pair of the pins 10 and it will be seen from FIG. 1, in particular, of the drawings that each of the two sets of three pivots 10 and 19 are spaced apart from one another in the direction A. Strengthening struts 17A extend substantially parallel to the direction A between the leading one of each pair of plates 11 and the front end of the corresponding tubular support 17 at a point immediately adjacent to the corresponding fork 18.

A horizontal beam 22 of circular cross-section (FIG. 4) extends parallel to the hollow beam 6 at a location immediately behind the beam 6 and at a level just beneath that of the frame beams 1 and 2. The beam 22 is turnable about its own longitudinal axis and extends substantially horizontally perpendicular to the direction A, said beam being provided near its opposite ends with two rearwardly extending arms 23 whose rearmost ends, in turn, are secured to a strip-shaped axle beam 24 at the opposite ends of which two ground wheels 25 are rotatably mounted. The two ground wheels 25 have a common axis of rotation which extends substantially horizontally perpendicular to the direction A. Brackets 26 project upwardly from the tops of the two arms 23 at locations immediately above the tubular beam 22. Horizontal pivot pins 26A at the upper ends of the brackets 26 turnably connect those brackets to the free ends of the piston rods of corresponding hydraulic piston and cylinder assemblies 27. Each assembly 27 extends substantially parallel to the direction A and has the base end of its cylinder, which is disposed foremost, pivotally connected to a corresponding support 28 (FIGS. 3 and 4) that projects upwardly from the portion 3 of the underlying beam 1 or 2. One side of the cylinder of each assembly 27 carries a corresponding substantially horizontal pivot 27A at a location substantially midway along the length of that cylinder and a corresponding latch 28A is turnably mounted on each pivot 27A. Each latch 28A has a laterally projecting stop 29A which, in the relative positions illustrated in the drawings, bears downwardly on the top of the cylinder of the corresponding assembly 27. When in this illustrated position, a slot 31A in each latch 28A make engagement with the corresponding substantially horizontal pivot pin 26A and it will be noted that the end of the latch 28A that is furthest from its pivot 27A is formed as a curved guide edge 30A that is arranged to direct the corresponding pivot pin 26A and slot 31A into engagement with one another under circumstances that will be discussed below. A pull member in the form of a rope or cable 32A extends forwardly from an upwardly directed limb of each latch 28A through appropriately positioned guide eyes towards the front of the frame and to a location on the agricultural tractor or other vehicle which tows and operates the implement that is accessible to the driver of that tractor or other vehicle.

Two pairs of vertically disposed and horizontally spaced apart lugs 30 (FIG. 3) project rearwardly from the hollow beam 26 at locations which are spaced by equal distances from the midpoint of that beam and that are quite close to the opposite ends thereof. Arms 30B are turnable upwardly and downwardly between the two lugs 30 of each pair about corresponding substantially horizontally aligned pivot pins that define an axis which is substantially perpendicular to the direction A. Each of the three hollow frame portions 7 and 12 is provided with a plurality (of which there are twelve in the embodiment illustrated in FIGS. 1 to 4 of the drawings) of vertical or substantially vertical shafts 31 whose longitudinal axes are arranged in regularly spaced apart relationship, the preferred spacing between each neighbouring pair of axes of rotation being substantially 25 centimeters. The lowermost end of each shaft 31 projects from beneath the bottom of the corresponding hollow frame portion and is there secured to the midpoint of a substantially horizontally disposed tine support 32 which has substantially vertical sleevelike tine holders at its opposite ends. Fastening portions of rigid tines 33 are firmly but releasably secured in the holders in a manner which it is not necessary to describe for the purposes of the present invention and it is noted that each tine support 32, together with its tine holders and the corresponding tines 33, constitutes a rotary soil working or cultivating member 34. Each shaft 31 is provided, inside the corresponding hollow frame portion 7 or 12, with a corresponding straight-toothed or spur-toothed pinion 35 which pinions are so dimensioned that, as can be seen in outline in FIG. 3 of the drawings, the teeth of each pinion 35 are in mesh with those of its neighbour, or of both of its neighbours, in the same hollow frame portion.

The two outer hollow frame portions 12 are of substantially symmetrically identical construction and arrangement and, in each of them, one of the center pair of shafts 31 has an upward extension into a gear box 36 that is mounted on top of the hollow frame portion concerned. Each gear box 36 is provided with a change-speed gear that is not illustrated in the drawings. Each gear box 36 has a rotary input shaft 37 which projects therefrom towards the aforementioned imaginary vertical plane of substantial symmetry of the implement h that extends parallel to the direction A. Universal joints 38 connect the input shafts 37 of the gear boxes 36 to the ends of corresponding telescopic transmission shafts 39 and the opposite ends of those shafts are connected by further universal joints 40 to the ends of corresponding shafts 41, said shafts 41 being rotatably journalled in horizontal sleeve bearings 42 carried by the supports 28 which are fastened to the portions 3 of the two frame beams 1 and 2. It will be noted from FIGS. 1 and 2 of the drawings that the centres of the universal joints 40 are located very close to the pivotal axes that are defined by the pins 10 and pivot pins 19.

That end of each rotary shaft 41 which is closest to the imaginary plane of substantial symmetry h is connected by a further universal joint 42A to one end of a corresponding telescopic shaft 42B, the opposite end of the shaft 42B being connected, in turn, to an output shaft 43 of a central gear box 43A by a further corresponding universal joint 42C. The central gear box 43A is mounted on top of the central hollow frame portion 7 above one of the center pair of shafts 31 that corresponds to that frame portion. It will be evident from the drawings that the two output shafts 43 of the central gear box 43A project substantially horizontally from the opposite sides of the gear box in directions that are substantially perpendicular to the direction A. The central gear box 43A although not illustrated in the drawings, is provided with a change-speed gear that serves for controlling the speed of rotation of the soil working or cultivating members 34 which correspond to the central hollow frame portion 7 in response to drive imparted to said central gear box 43A at a more or less constant speed. Thus, a splined or otherwise keyed rotary input shaft 44 projects forwardly in substantially the direction A from the front of the central gear box 43A and is connected by a universal joint 45 (FIG. 3) to the rear end of a transmission shaft 46, the leading end of said shaft 46 being in driven communication, by way of a further universal joint (FIG. 1) with the rearwardly directed driving shaft of an internal combustion or other engine 47 that is supported by the convergent portions 4 of the frame beams 1 and 2 at a location immediately to the rear of the coupling fork 5. The driving shaft of the engine 47 extends substantially horizontally parallel to the direction A.

Substantially horizontal pivot pins 48 that extend substantially parallel to the direction A are entered through slots 49A formed at the tops of those two vertical plates 11 that are foremost with respect to the direction A, said pivot pins 48 connecting forks at the free ends of the piston rods of corresponding hydraulic piston and cylinder assemblies 49 to the leading plates 11. An upright strip 51 is carried on top of the base of the tie beam 6A and horizontal pivot pins 50 turnably connect the bases of cylinders 52 of said assemblies 49 to the opposite ends of the strip 51. Each cylinder 52 is provided, very close to the end thereof that is remote from the strip 51, with substantially horizontally disposed trunnion pins 54 about which a corresponding bracket 53 is turnable, the brackets 53 being arranged to project upwardly above the cylinders 52 of the assemblies 49. The substantially horizontal axes that are defined by the trunnion pins 54 extend parallel or substantially parallel to those that are defined by the corresponding pivot pins 48 and 50. The downwardly directed limbs of each bracket 53 also form parts of latches 55 which latches project from the trunnion pins 54 in directions that are perpendicular to the brackets 53 that project upwardly from said pins 54. The latches 55 extend at both sides of the piston rods of the corresponding assemblies 49 and thus towards the leading plate 11 of the nearest hollow frame portion 12. Each latch 55 comprises a slot 57 that opens onto the lower edge of the latch concerned and an adjoining inclined guide surface 56 that is so disposed that it will co-operate with a corresponding pin 68 in a manner that will be further discussed below. The top of each bracket 53 has one end of a corresponding pull member in the form of a rope or cable 58 connected to it, the ropes or cables 58 extending from the brackets 53 through appropriately positioned guide eyes on the strip 51 and the casing of the engine 47 to positions where they are accessible to the driver of the agricultural tractor or other vehicle which tows and operates the latter when it is in use. The functions of the ropes or cables 58 and the latches 55 to which they are connected will be described below.

The opposite ends of the hollow frame portion 7 and the opposite ends of the two hollow frame portions 12 are all closed by corresponding upright plates 59, each of the six upright plates 59 having a corresponding arm 60 turnable upwardly and downwardly alongside it about an axis that is defined by a corresponding strong horizontal pivot that is located at substantially the front of the plate 59 concerned with respect to the direction A. Each plate 59 is formed close to its rearmost edge with a row of holes 63 that are equidistant from the axis that is defined by the pivotal mountings of the arms 60 that correspond to the same hollow frame portion and the arms 60 themselves are formed with single holes that can be brought into register with any chosen ones of the holes 63 in the corresponding rows. Horizontal bolts 62, or equivalent locking pins, are provided for entry through the holes in the arms 60 and the chosen holes 63 and, when said bolts 62 are tightened, they positively retain the arms 60 in chosen angular positions about the pivotal connections of those arms to the corresponding hollow frame portions. The rearmost ends of the arms 60 with respect to the direction A are inclined downwardly and three rotatable supporting members in the form of open ground rollers 61 are rotatably supported by substantially horizontally bearings between the rearmost extremities of the three pairs of arms 60 that correspond to the respective three hollow frame portions 7 and 12. It will be evident that the level of the axis of rotation of each roller 61 that is set by choosing appropriate holes 63 in the plates 59 for co-operation with the bolts 62 is a principal factor in determining the maximum depth of penetration into the soil which is possible for the tines 33 of the rotary soil working or cultivating members 34 (see FIG. 4). Two shield plates 64 that are normally substantially vertically disposed and that both extend substantially parallel to the direction A are provided immediately beyond the opposite ends of the single row of thirty-six members 34 that exists when the implement is disposed in its working position as illustrated in FIGS. 1 to 4 of the accompanying drawings. Each shield plate 64 is constructed and arranged so that its lowermost edge can slide over the ground surface is substantially the direction A and, in order to enable it to match undulations in the surface of the soil which it may meet, it can turn upwardly and downwardly, as many be required, about a substantially horizontal axis that extends substantially parallel to the direction A. As can be seen in outline in FIG. 1 of the drawings, each such axis is afforded by an arm that co-operates with bearing lugs or the like mounted on top of the hollow frame portion 12 concerned, said arm being secured to the top of the corresponding plate 64 and being freely pivotable in the corresponding bearing lugs or the like. The shield plates 64 co-operate with the neighbouring soil working or cultivating members 34 in minimising ridging of the soil at the margins of the path of travel of the implement and also tend to prevent stones or other potentially dangerous objects from being flung laterally from the implement by the rapidly moving tines 33. A screening member 14A of substantially L-shaped cross-section (see FIG. 4) is provided immediately in front of each group of soil working or cultivating members 34, with respect to the direction A, at a level which is the same as that of the tine supports 32 and the fastening regions of the tines 33. Springs whose arrangements it is not necessary to describe for the purposes of the present invention are arranged to maintain the three screening members 64A in the positions thereof that are illustrated in the drawings but, in the event of a stone or other obstacle becoming momentarily jammed between, for example, one of the tine holders and the rear of one of the members 64A, that member can yield forwardly, against the action of the corresponding springs, to allow the stone or other obstacle to be released. Although not referenced, one of the springs is illustrated in FIGS. 2 and 3 of the drawings. The screening members 64A very greatly reduce the damage that would otherwise be caused to the tine supports 32, the tine holders at the ends of those supports and the fastening portions of the tines 33 as the result of impacts against sharp stones and the like.

In the use of the soil cultivating implement that has been described with reference to FIGS. 1 to 4 of the drawings, the coupling fork 5 is connected to a tow bar at the rear of an agricultural tractor or other operating vehicle and hydraulic ducts (not illustrated) are connected to the hydraulic system of that tractor or other vehicle to enable the piston and cylinder assemblies 27 and 49 to be operated by the driver of the tractor or other vehicle. Before operation commences, the levels of the axes of rotation of the three rollers 51 are set relative to the levels of the corresponding hollow frame portions 7 and 12 to govern the maximum depth of penetration of the tines 33 into the soil which will be possible when the implement is operating. Moreover, the change-speed gears (not illustrated) that are associated with the three gear boxes 36 and 43A are set to give appropriate speeds of rotation of the shafts 31 and corresponding members 34 having regard to the nature and condition of the soil that is to be worked and the degree of soil fineness that is required when the soil has been worked by the implement. The ground wheels 25 are bodily displaceable, upwardly and downwardly, relative to the hollow frame portion 7 by extending or retracting the piston rods of the assemblies 27 and, when operation is about to commence, the ground wheels 25 are raised to enable the rollers 61 to make framesupporting contact with the ground surface. As the implement moves over the ground in the direction A, the drive transmission that has been described causes all of the soil working or cultivating members 34 to revolve and, due to the intermeshing arrangement of the pinions 35, each member 34 will revolve in the opposite direction to its immediate neighbor, or to both of its immediate neighbours, in the same group that corresponds to one of the three hollow frame portions 7 or 12. The distances between the tips of the two tines 33 of each member 34 are a little greater than are the distances (preferably substantially 25 centimeters) between the axes of rotation of immediately neighbouring shafts 31 in each group and, accordingly, the strips of land that are worked by the individual members 34 overlap one another to form a single broad strip of worked soil. This strip of soil is smooth and substantially uninterrupted throughout the working width of the implement because the members 34 that adjoin the two junctions between the central hollow frame portions 7 and the two outer hollow frame portions 12 either work slightly overlapping strips of soil or strips that at least adjoin one another. Generally speaking, the soil working or cultivating members 34 are rotated by power derived from the internal combustion or other engine 47 as is illustrated in FIG. 1 of the drawings but it is noted that, as will be further discussed below, this arrangement is not essential. Each of the three groups of soil working or cultivating members 34 has an effective width of substantially three meters with the preferred spacing between the axes of rotation of the shafts 31 of substantially 25 centimeters Thus, the whole implement has a total working width of substantially 9 meters.

A further agricultural implement may be arranged behind the soil cultivating impelment to enable two agricultural operations to be performed simultaneously. FIG. 1 of the drawings illustrates the arms 30B arranged with their leading ends pivotally mounted between the pairs of lugs 30 for the connection of a further agricultural implement which, in the example illustrated in FIG. 1, is a precision seed drill 65. The drill 65 comprises a main frame beam 66 that extends substantially horizontally perpendicular to the direction A throughout substantially the whole of the working width of the foregoing soil cultivating implement. A plurality, such as twelve, of precision sowing units 67 are connected to the beam 66 at regular intervals along the length of that beam but it is not necessary to describe the construction nor function of the precision sowing units 67 in detail for the purposes of the present invention, such units 67 being known per se. The main frame beam 66 of the precision seed drill 67 is provided in a central region thereof with a coupling member or trestle 67A of generally triangular configuration and that coupling member or trestle 67A is connected by three forwardly directed links (the upper one of which is adjustable in length) to a second generally triangular coupling member or trestle 66B. The coupling member or trestle 66B is arranged for pivotal connection to substantially horizontally aligned pins carried by the arms 30B near to the rearmost ends of those arms. The rearmost extremities of the arms 30B carry laterally projecting stops 30C that engage beneath the lower links interconnecting the two coupling members or trestles 66A and 66B and prevent the coupling member of trestle 66A and the precision seed drill 65 to which it is secured from turning too far downwardly relative to the coupling member or trestle 66B.

During the use of the soil cultivating implement of FIGS. 1 to 4 of the drawings with or without the precision seed drill 65 or some other simultaneously employed implement, the central hollow frame portion 7 and the members 34 which it supports can move upwardly and downwardly relative to the frame because of its connection to that frame by the parallelogram linkages 7A- The central group of rotary soil working or cultivating members 34 can thus match any undulations in the surface of the soil that are met with and can deflect upwardly to avoid damage by embedded rocks or other obstacles. The two outer hollow frame portions 12 and the members 34 which they support can also move upwardly and downwardly for the same purposes because the vertical plates attheir inner ends are connected to the lugs 9 through the intermediary of the pins 10 which pins are freely movable upwardly and downwardly along the vertical or substantially vertical slots 9A that are formed in said lugs 9. Pivotal movements about the axes defined by the pins 10 and pivot pins 19 are also possible because the leading plates 11 are connected to the piston rods of the hydraulic piston and cylinder assemblies 49 through the intermediary of the pivot pins 48 and the slots 49A, said pivot pins 48 being freely movable along those slots 49A. The parallelogram linkages 7A by which the central hollow frame portion 7 is floatingly mounted and the slots 9A and 49A through the intermediary of which the outer hollow frame portions 12 are floatingly mounted enable the soil working or cultivating members 34 to match undulations in the surface of the soil that may be met with particularly satisfactorily across the whole working width of the implement, the members 34 being capable of deflecting to avoid embedded rocks or other obstacles that might otherwise break the tines 33 without the floating arrangement detracting from the very effective cultivation which the implement can produce. If an agricultural tractor or other operating vehicle is employed that has a high power output of which a large part can be used to rotate its power take-off shaft, then that power take-off shaft can be indirectly connected to the rotary input shaft 44 of the central gear box 43A while the engine 47 remains inoperative.

When the implement is to undergo inoperative transport along public roads or the like, the piston rods of the two double-acting assemblies 49 are retracted into the cylinders 52 of those assemblies and this causes the two outer hollow frame portions 12 and the members 34 which they support to tilt upwardly and inwardly about the axes that are defined by the pins 10 and pivot pins 19. When the piston rods of said assemblies 49 are fully retracted into the cylinders 52, the pins 68 that are carried by the leading plates 11 meet the inclined guide surfaces 56 of the latches 55 and turn those latches upwardly through a few degrees about the axes that are defined by the corresponding trunnion pins 54. As soon as the pins 68 move past the lowermost ends of the surfaces 56, the latches 55 turn back through a few degrees about the axes that are defined by the corresponding trunnion pins 54, under the action of gravity, so that the slots 57 in said latches 55 come into retaining engagement with the pins 68. When this condition is reached, the two outer hollow frame portions 12 will have been tilted upwardly and inwardly substantially as far as they will go and, when hydraulic pressure is withdrawn from the assemblies 49, the outer hollow frame portions 12 remain reliably in their upwardly and inwardly tilted positions because of the engagement of the slotted latches 55 with the pins 68. After the outer hollow frame portions 12 have been folded upwardly and inwardly, the hydraulic piston and cylinder assemblies 27 are operated to displace the ground wheels 25 bodily downwards towards the ground surface with the result that the frame of the implement is raised and brings both the central roller 51 and the tines 33 of the central group of members 34 clear of contact with the ground surface. This state of affairs can be seen in FIG. 2 of the drawings although it is noted that, in FIG. 2 the outer hollow frame portion 12 which is visible therein remains in its operative position and is not tilted upwardly and inwardly for transport purposes. It will be remembered that the stops 7B prevent the central hollow frame portion 7 and the members 34 and roller 61 which are connected thereto from turning too far downwardly relative to the frame as a result of the arrangement of the parallelogram linkages 7A. After the ground wheels 25 have been bodily displaced donwardly to raise the frame of the implement relative to the ground surface, the hydraulic piston and cylinder assemblies 27 may be operated to reverse that displacement to a small degree with consequent minimal lowering of the frame and upward bodily displacement of the ground wheels 25. The action which has just been described involves the withdrawal of the pistons of the assemblies 27 into their cylinders through short distances and, as that takes place, the pivot pins 26A come into contact with the curved guide edges 30A of the latches 28A and turn those latches upwardly about the axes defined by the pivots 27A. The pins 26A soon come into register with the open lower ends of the slots 31A and gravity causes the latches to turn downwardly about the pivots 27A until the stops 27A bear against the tops of the cylinders of the assemblies 27 and the pivot pins 26A are reliably at the upper ends of the slots 31A. Hydraulic pressure can then be withdrawn from the assemblies 27 while the latches 28A maintain the ground wheels 25 in their bodily downwardly displaced positions. When the precision seed drill 65 is also to undergo in-operative transport, a pair of ground wheels 69 and an adjustable arched mounting therefor is connected to the main frame beam 66 towards one end thereof and the coupling member or trestle 66A is disconnected from the coupling member or trestle 66B. A vertical coupling pin 66A at the end of the main frame beam 66 which is remote from the end thereof near which the pair of ground wheels 69 is disposed is entered through a coupling eye 69B that is located midway along the strip-shaped axle beam 24 for the ground wheels 25 of the soil cultivating implement. The precision seed drill 65 can then be towed behind the soil cultivating implement with its main frame beam 66 in substantially parallel relationship with the direction A. In its inoperative transport position, the soil cultivating implement alone, or the combination of the soil cultivating implement and the precision seed drill 66 has an overall width of substantially 4.0 meters.

When the soil cultivating implement is to be brought from its inoperative transport position to its working position, the driver of the tractor or other operating vehicle pulls the ends of the ropes or cables 32A that are accessible to him and this action turns the latches 28A upwardly (in clockwise directions as seen in FIG. 4) about the corresponding pivots 27A and releases the pivot pins 26A from the slots 31A. The ground wheels 25 can then be displaced bodily upwards to allow the frame of the implement to move downwardly until the central roller 51 and the members 34 of the central group thereof come into contact with the ground surface. Subsequently, the outer hollow frame portions 12 and the parts which they carry are tilted outwardly and downwardly into the operative position illustrated in FIGS. 1 to 4 of the drawings and this entails the driver of the agricultural tractor or other operating vehicle pulling upon the ends of the ropes or cables 58 that are accessible to him whereupon the latches 55 are turned upwardly about the axes defined by the trunnion pins 54 to free the pins 68 from the slots 57 whereafter suitable manipulation of hydraulic controls in the tractor or other operating vehicle will extend the piston rods of the assemblies 49 and allow the outer hollow frame portions 12 to turn gently downwardly until the tines 33 of their soil working or cultivating members make contact with the ground surface. The hydraulic piston and cylinder assemblies 27 and 49 cushion the displacements which they bring about, or allow, so that there is no danger of damage being caused by hard collisions with the ground surface by the parts that are being displaced. It is noted that forward and downward tilting of the frame of the soil cultivating implement is prevented when that implement is disconnected from an agricultural tractor or other operating verhicle by the provision of a ground wheel 69B (FIG. 1) that supports the frame from beneath at a location immediately to the rear of the coupling fork 5.

FIGS. 5 to 8 inclusive of the drawings illustrate a further form of soil cultivating implement in accordance with the invention, many of the parts of this further embodiment being similar, or identical, to parts that have already been described with reference to FIGS. 1 to 4 of the drawings. Accordingly, such parts are indicated in FIGS. 5 to 8 inclusive by the same references as have been used in FIGS. 1 to 4 of the drawings and will not be described again in detail. In the embodiment of FIGS. 5 to 8, the central hollow frame portion 7 has a supporting structure which comprises two frame beams 70 and 71 that both extend substantially horizontally perpendicular to the direction A in spaced apart relationship in that direction, the beam 70 being in advance of the beam 71. Locations that are close to the opposite ends of the two beams 70 and 71 are rigidly secured to the overlying rear portions 3 of the two beams 1 and 2 by upwardly directed brackets. As can be seen best in FIG. 8 of the drawings, each of the two beams 70 and 71 is of hollow formation and square cross-section, both beams being so disposed that, as seen in cross-section, diagonals between their opposite corners are respectively substantially horizontally and substantially vertically disposed. Although a square cross-section is preferred for the beams 70 and 71, it is not essential and the beams may have other polygonal cross-section. The leading frame beam 70 is provided, between the portions 3 of the two frame beams 1 and 2, with upright supports 72 that are spaced by short distances from the corresponding beams 1 and 2 (see particularly FIGS. 6 and 7). Each upright support 72 is connected by a pair of rearwardly extending strips 73 to the upper end of a corresponding upwardly and forwardly inclined support 74 whose lower end is rigidly secured to the frame beam 71. The upper end of each support 74 is sandwiched between the rearmost ends of the corresponding pair of strips 73. Each upright support 72 is also connected by upper and lower pivot pins to the leading ends of upper and lower pairs of rearwardly extending links 75 and the rearmost ends of each pair of links 75 are pivotally connected by upper and lower pins to upright portions of corresponding brackets 146 that are fastened to the top of the central hollow frame portion 7. As can be seen in the drawings, the upright supports 72 are sandwiched between the two links 75 of each of the corresponding two pairs of those links and the same is true of the brackets 76 at the other rear ends of the links 75. The links 75 are members of spaced parallelogram linkages 77 which are so arranged that the central hollow frame portion 7 and its members 34 can move upwardly and downwardly relative to the frame of the implement without tilting. It will also be noted from the drawings that each substantially planar bracket 76 is located slidably between the corresponding pair of fixed strips 73 so that said strips 73 will serve as retaining guides for the parallelogram linkages 77 and will prevent significant lateral displacements that might lead to deterioration or failure of the parallelogram linkages.

The opposite ends of the leading substantially horizontal frame beam 70 are provided with upwardly and outwardly inclined lugs 78 and the opposite ends of the rear substantially horizontal frame beam 71 are provided with similarly disposed lugs 78A. The upper and outer ends of the lugs 78 and 78A are provided with horizontally aligned stub shafts 79 to which further lugs 80A are turnably connected. The further lugs 80A are sucured to the ends of leading and rear beams 81 and 82 that are of similar construction and arrangement to the beams 70 and 71 and which, when the implement is disposed in its working position on flat land, are in substantially horizontal register with said beams 70 and 71 at opposite ends of those beams. The beams 81 and 82 thus have the outer hollow frame portions 12 connected to them in an upwardly and downwardly displaceable manner by parallelogram linkages that are similar to the parallelogram linkages 77 that already been described and it will be noted from FIG. 5 of the drawings that supports 81A which extend substantially parallel to the direction A rigidly interconnect the beams 81 and 82 at locations which are near to the ends of those beams that are remote from the central frame beams 70 and 71. Each outer hollow frame portion 12 and the parts which it carries is turnable upwardly and inwardly with respect to the central hollow frame portion 7 about a corresponding axis which is defined by two of the stub shafts 79 and the corresponding pivot pin 19, said pin 19 and stub shafts 79 being spaced apart from one another in the direction A. In this embodiment, the tubular supports 17 are fastened to the leading frame beams 81 that correspond to the two outer hollow frame portions 12 at positions which are in register with the supports 81A and the strengthening struts 17A interconnect the forks 18 and the corresponding leading lugs 80A. Moreover, forwardly divergent supports 21A (FIG. 5) interconnect the forwardly convergent portions 4 of the two frame beams 1 and 2 and locations on the substantially horizontal beam 21.

Each of the leading lugs 80A with respect to the direction A carries a corresponding forwardly directed bracket 80 whose leading end has an upright limb to which a fork at the end of a piston rod of a corresponding hydraulic piston and cylinder assembly 53 is turnably connected by a horizontal pivot pin 90. The base end of the cylinder 85 of each assembly 83 is turnably connected by a parallel pivot pin to the upright limb of a corresponding bracket 84 which is fastened to the leading frame beam 70 at a location spaced some distance from the midpoint of the beam 70. Each cylinder 85 has a horizontal pivot 86 projecting from one side thereof and a corresponding latch 87 is turnably mounted on that pivot. Each latch 87 is formed with a slot 89 that opens onto the edge of the latch close to the end thereof that is remote from the corresponding pivot 86, said end itself being formed as a curved guide edge 88 whose lowermost extremity terminates alongside the corresponding slot 89. Each latch 87 is arranged to co-operate, by way of its guide edge 88 and slot 89, with one end of the corresponding pivot pin 90. When the outer hollow portions 12 and the parts which they carry are pivoted upwardly and inwardly relative to the central hollow frame portion 7 to bring them to positions similar to that which is shown for one of them in broken lines in FIG. 6 of the drawings, the latches 87 make retaining engagement with the pivot pins 90 and prevent the outer hollow frame portions 82 from being turned outwardly and downwardly again until said latches 87 are released. Hydraulic pressure can thus be discontinued in the hydraulic piston and cylinder assemblies 83 with no danger of an involuntary return of the implement to its working position. Pull members in the form of ropes or cables 91 have their ends connected to upright limbs of the latches 87 and extend flexibly by way of suitably positioned guide eyes to a location on the co-operating tractor or other operating vehicle which is accessible to the driver thereof. When the driver of the tractor or other vehicle pulls the ropes or cables 91, he will turn the latches 87 upwardly and disengage the slots 89 that are formed therein from the pivot pins 90 thus releasing the hydraulic piston and cylinder assemblies 83 so that their pistons can extend from the cylinders 85 and allow the cuter hollow frame portions 12 and the parts which they carry to turn outwardly and downwardly into the working position of the implement in a gently cushioned manner. In the embodiment in FIGS. 5 to 8 of the drawings, helical tension springs 27D are stretched between the upper ends of supports 27C which are rigidly secured to the top of the hollow beam 6 and the upper ends of arms 27B whose lower ends are connected to the portions 3 of the two beams 1 and 2 by substantially horizontally aligned pivot pins. With this arrangement, the ground wheels 25 of the implement are urged resiliently downwardly into contact with the ground surface.

In the embodiment of FIGS. 5 to 8 of the drawings, the rotatable supporting members that are afforded by the ground rollers 61 are carried by corresponding pairs of arms 60A that are directed rearwardly with respect to the direction A from supports 60B that are upwardly and downwardly displaceable relative to the beams 71 and 82. The means by which each support 60B is upwardly and downwardly displaceable may be of a kind which is known per se and which, accordingly, will not be described in detail. Each such means comprises a crank handle 60C at its upper end, the arrangement being such that manual rotation of each crank handle 60C in one direction will raise the corresponding support 60B while manual rotation thereof in the opposite direction will lower that support. Clearly, such raising and lowering of the supports lowers or raises the levels of the axes of rotation of the rollers 61 relative to the corresponding frame beams 70/71 or 81/82 and thus is a principal factor in determining the maximum depth of penetration of the tines 33 into the soil that is possible. In the embodiment of FIGS. 5 to 8 of the drawings, the three groups of rotary soil working or cultivating members 34 are movable upwardly and downwardly in an independent manner during the operation of the implement because the hollow frame portion 7 or 12 that coresponds to each such group is mounted in a floating manner by the corresponding pair of parallelogram linkages 77, such linkages being guided by the pairs of strips 73 in such a way as to absorb any forces tending to produce lateral deformations. The strips 73 are also arranged so as to prevent the hollow frame portions 7 and 12 from moving too far downwardly, particularly when the implement is disposed for inoperative transport. The floating arrangement of the three groups of soil working or cultivating members 39 by way of the parallelogram linkages 77 provides a very satisfactory matching of the members 34 to the soil surface throughout the working width of the implement even on undulating land and the ready deflectability of each group that is possible, independently of the other groups, enables any embedded rock or other fixed obstacle to be avoided with a minimum of damage, if any. To bring the implement from its working position to its inoperative transport position, the outer hollow frame portions 12 and the parts which they carry are tilted upwardly and inwardly by the hydraulic piston and cylinder assemblies 83 that are under the control of the driver of the agricultural tractor or other vehicle which tows the implement. As previously mentioned, the final upwardly tilted position of one of the two outer hollow frame portions 12 is illustrated in broken lines in FIG. 5 of the drawings. The further adjustments of the implement that are required to bring it into a condition suitable for transport, particularly along public roads, involve the bodily downward displacement of the ground wheels 25 and are carried out in a manner similar to that which has already been described in connection with the preceding embodiments.

Although certain features of the various soil cultivating implement embodiments that have been described and/or illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

What we claim is:

1. A soil cultivating implement comprising a main frame and a first group of soil working members being journalled in a central elongated portion of said frame, said central portion extending transverse to the direction of travel, outer frame portions supporting corresponding groups of soil working members being linked at the lateral sides of said central portion, at least one outer frame portion being elongated and extending transverse to the direction of travel, driving means engaging the soil working members to rotate same during operation, said outer frame portion being linked to the central portion by at least one pivot connection and also interconnected to said central portion by a respective adjusting cylinder assembly, said cylinder assembly being interconnected to said outer portion with a connection including pin means, said pin means being held by lug means and said pin means being displaceable within limits defined by said lug means, said outer portion being independently movable with respect to said central portion, to match ground undulations during travel, latching means releasably connecting said outer portion to said central portion, said latching means being positioned to automatically engage retaining means and secure the outer portion in an upwardly extending transport position, said latching means, at least in part, being interconnected to the cylinder of said assembly.

2. An implement as claimed in claim 1, wherein the assemblies and respective latches are mounted on said central portion and said latches are arranged to co-operate retainingly with a corresponding pin carried by each outer frame portion.

3. An implement as claimed in claim 1 wherein said pin means comprises at least one pivot pin that extends substantially parallel to the direction of travel and is displaceable within a guide slot in a lug that is attached to said outer portion.

4. An implement as claimed in claim 3 wherein said guide slot is elongated and the longitudinal axis thereof extends substantially horizontally.

5. A soil cultivating implement comprising a main frame and a first group of soil working members being journalled in a central elongated portion of said frame, said central portion extending transverse to the direction of travel, outer frame portions supporting corresponding groups of soil working members being linked at the lateral sides of said central portion, at least one outer frame portion being elongated and extending transverse to the direction of travel, driving means engaging the soil working members to rotate same during operation, said outer frame portion being linked to the central portion by at least one pivot connection and also interconnected to said central portion by an adjusting cylinder assembly, said cylinder assembly being interconnected to said outer portion with a connection including pin means, said pin means being held by lug means and said pin means being displaceable within limits defined by said lug means, said outer portion being independently movable with respect to said central portion to match ground undulations, said main frame having supporting wheels pivoted thereto and said wheels being pivotable downwardly to a transport position in which said first group of members is raised to avoid contact with the ground, latching means releasably connecting the outer frame portion to said central portion, said latching means being positioned to automatically engage retaining means and secure said outer portion in an upwardly extending transport position.

6. A soil cultivating implement comprising a main frame and a first group of soil working members being journalled in a central elongated portion of said frame, said central portion extending transverse to the direction of travel, respective outer frame portions supporting corresponding groups of soil working members being linked at the lateral sides of said central portion, at least one outer frame portion being elongated and extending transverse to the direction of travel and driving means engaging said soil working members to rotate same during operation, said outer frame portion being linked to the central portion by at least one pivot connection and also interconnected to said central portion by an adjusting cylinder assembly, said cylinder assembly being interconnected to said outer portion with a connection including pin means, said pin means being held by lug means and said pin means being displaceable within limits defined by said lug means, said outer portion being independently movable with respect to said central portion to match ground undulations, each group of soil working members being supported by respective beams and corresponding spaced apart parallelogram linkages that interconnect said central and outer frame portions to said beams, at least one parallelogram linkage comprising a guide assembly that permits upward and downward displacements of said linkage while preventing relative lateral movements.

7. An implement as claimed in claim 5, wherein said wheels are interconnected by an axle and said axle is pivoted to said main frame, retaining means comprising a latch and a further hydraulic piston and cylinder assembly being mounted on the main frame to co-operate with a pin element on a support connected to said axle, said latch engaging said element when said wheels are pivoted to an elevated position.

8. An implement as claimed in claim 7, wherein said wheels are positioned in back of said main frame and a respective further hydraulic piston and cylinder assembly displaces each wheel.

* * * * *